(12) United States Patent
Subramanian et al.

(10) Patent No.: US 9,403,452 B2
(45) Date of Patent: Aug. 2, 2016

(54) VEHICLE SEAT BOTTOM ASSEMBLY HAVING AN ANTI-SUBMARINE DEVICE

(71) Applicants: Arunkumar Subramanian, Chennai (IN); Prasanna Venkatakrishnan, Chennai (IN)

(72) Inventors: Arunkumar Subramanian, Chennai (IN); Prasanna Venkatakrishnan, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 85 days.

(21) Appl. No.: 14/333,573

(22) Filed: Jul. 17, 2014

(65) Prior Publication Data

US 2016/0016492 A1    Jan. 21, 2016

(51) Int. Cl.
  *B60N 2/42*    (2006.01)
  *B60N 2/427*   (2006.01)

(52) U.S. Cl.
  CPC .......... *B60N 2/42763* (2013.01); *B60N 2/4221* (2013.01)

(58) Field of Classification Search
  CPC .................................................. B60N 2/42763
  USPC .......................................... 297/216.1, 284.11
  See application file for complete search history.

(56) References Cited

U.S. PATENT DOCUMENTS

| 4,334,709 | A * | 6/1982 | Akiyama | B60N 2/62 297/284.11 |
| 6,450,573 | B1 * | 9/2002 | Yamaguchi | B60N 2/4221 297/216.1 |
| 7,192,087 | B2 * | 3/2007 | Adragna | B60N 2/62 297/216.1 |
| 7,413,246 | B2 | 8/2008 | Saiguchi et al. | |
| 8,100,471 | B2 | 1/2012 | Lawall et al. | |
| 8,240,758 | B2 * | 8/2012 | Combest | B60N 2/4221 297/216.1 |
| 8,297,697 | B2 | 10/2012 | Gross et al. | |
| 8,393,681 | B2 | 3/2013 | Gross et al. | |
| 8,919,876 | B2 * | 12/2014 | Sawada | B60N 2/4228 297/216.1 |
| 2002/0003365 | A1 * | 1/2002 | Yamaguchi | B60N 2/4221 297/216.1 |
| 2002/0053792 | A1 | 5/2002 | Yamaguchi et al. | |
| 2002/0053793 | A1 * | 5/2002 | Yamaguchi | B60N 2/4221 280/748 |
| 2003/0034679 | A1 * | 2/2003 | Choi | B60N 2/4221 297/216.1 |
| 2004/0055806 | A1 | 3/2004 | Masuda et al. | |
| 2006/0125296 | A1 | 6/2006 | Hippel et al. | |

FOREIGN PATENT DOCUMENTS

JP    59114135 A * 7/1984

* cited by examiner

*Primary Examiner* — David R Dunn
*Assistant Examiner* — Alexander Harrison
(74) *Attorney, Agent, or Firm* — Ralph E. Smith

(57) ABSTRACT

A seat bottom assembly includes a seat bottom frame and an anti-submarining device having a pivot shaft and a panel. The frame extends along a longitudinal axis between a front edge and a rear edge and the pivot shaft is mounted on the frame. The panel extends along the longitudinal axis between a front edge and a rear edge and is mounted to the pivot shaft for pivoting movement between a design position and an open position angularly spaced from the design position. The panel opposes forward displacement of an occupant supported by the frame while in the open position. The rear edge of the panel is spaced forward of a midpoint of the frame such that only a forward portion of the seat bottom assembly between the midpoint and the front edge of the frame opposes forward displacement of the occupant when the panel is in the open position.

15 Claims, 5 Drawing Sheets

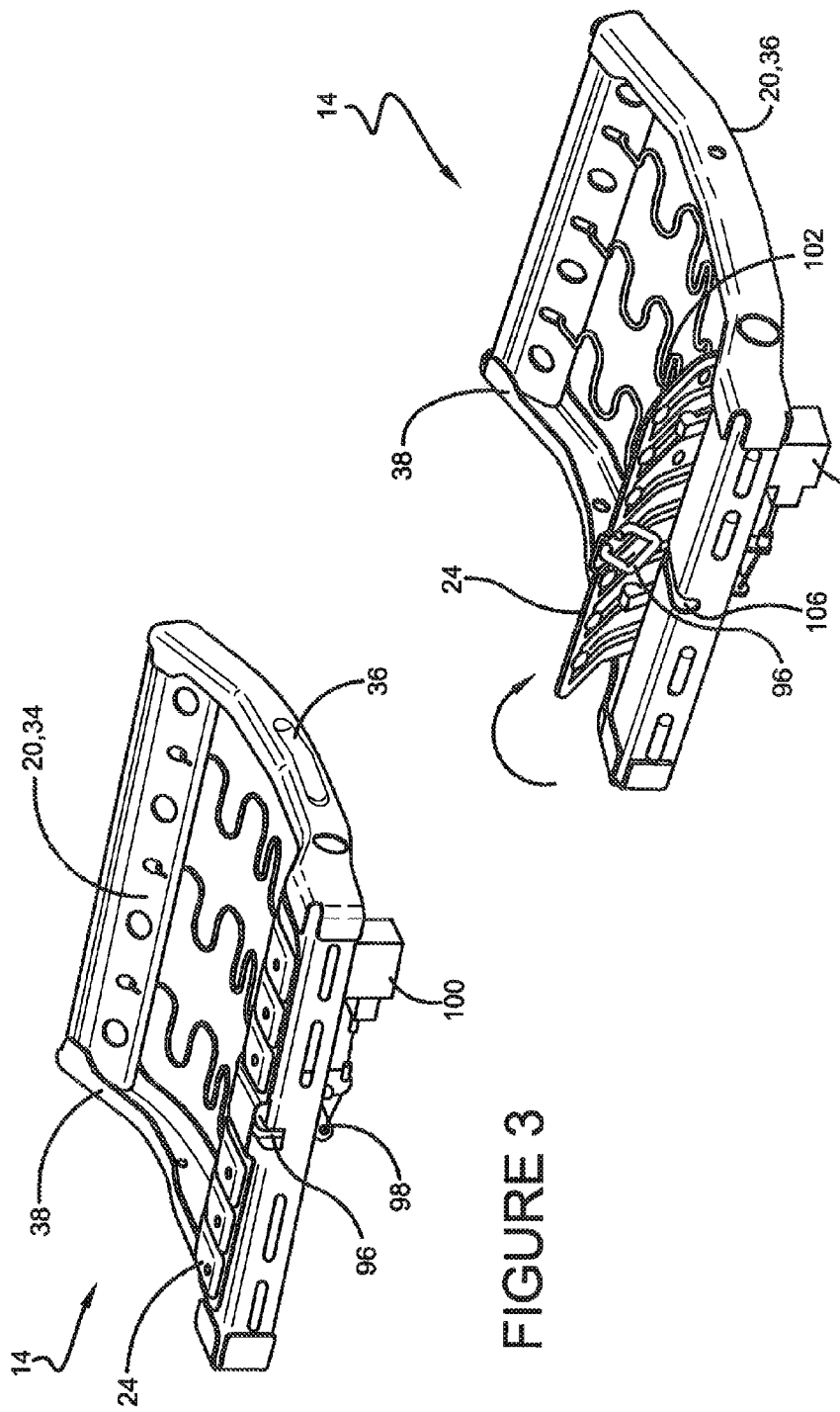

VEHICLE SEAT BOTTOM ASSEMBLY HAVING AN ANTI-SUBMARINE DEVICE

FIELD

The present disclosure relates generally to a seat for a vehicle and, more particularly, to a seat bottom having an anti-submarining device.

BACKGROUND

In the field of vehicle seating, the term "submarining" refers to the potential slipping forward of a vehicle occupant along the seat, under the lap section of the seat belt, during rapid deceleration of the vehicle. Such situations can arise during an actual or an imminent but averted frontal impact event for example. Anti-submarining devices in the art cause at least a portion of the seat cushion, or the seat bottom, to rotate in response to rapid deceleration. As a result, the vertical gap between the lap belt and the seat bottom is reduced, decreasing the potential likelihood that the occupant would slip through the gap. Often, anti-submarining devices cause the rotation or raising of a plate that is positioned, generally, in the middle of the seat bottom since the middle portion of the seat is closest to the gap between the lap belt and the seat bottom. However, the actuator moving the plate must be sufficiently robust to rotate or raise the plate against the pelvic region of the occupant. Further, the movement must occur quickly, but the plate should not move so abruptly as to inflict potential discomfort to the occupant. While such anti-submarining devices systems work for their intended purpose, there remains a need for improvement in the relevant art.

SUMMARY

In one aspect, a seat bottom assembly for a vehicle is provided in accordance with the teachings of the present disclosure. In an exemplary embodiment, the seat bottom assembly includes a seat bottom frame and an anti-submarining device configured to minimizing submarining movement of an occupant during rapid deceleration of the vehicle. The seat bottom frame extends along a longitudinal axis of the vehicle between a front edge and a rear edge. The anti-submarining device includes a pivot shaft mounted on the seat bottom frame and a panel. The panel extends along the longitudinal axis of the vehicle between a front edge and a rear edge and is mounted to the pivot shaft for pivoting movement between a design position and an open position that is angularly spaced from the design position and in which the panel's front edge is elevated. The panel is configured to oppose forward displacement of the occupant supported by the seat bottom frame while in the open position. The rear edge of the panel is spaced forward of a midpoint of the seat bottom frame along the longitudinal axis. As a result, only a relatively small, forward portion of the seat bottom assembly between the midpoint and the front edge of the seat bottom frame is configured to oppose forward displacement of the occupant when the panel is in the open position.

In some implementations, the seat bottom assembly includes a biasing device operably positioned between the seat bottom frame and the panel to urge the panel to the open position. In some implementations, the seat bottom assembly includes a one-way locking device in various embodiments of the present disclosure. The one-way locking device permits pivoting movement of the panel from the design position but prevents pivoting movement of the panel to the design position. The one-way locking device ensures that the panel will not revert to the design position during rapid deceleration of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature, intended for purposes of illustration only, and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a perspective view of the exemplary seat bottom assembly shown in FIG. 2 with a panel in the design position according to the principles of the present disclosure;

FIG. 4 is a perspective view of the exemplary seat bottom assembly shown in FIGS. 2 and 3 with the panel in the open position according to the principles of the present disclosure;

DESCRIPTION

Figure 1:
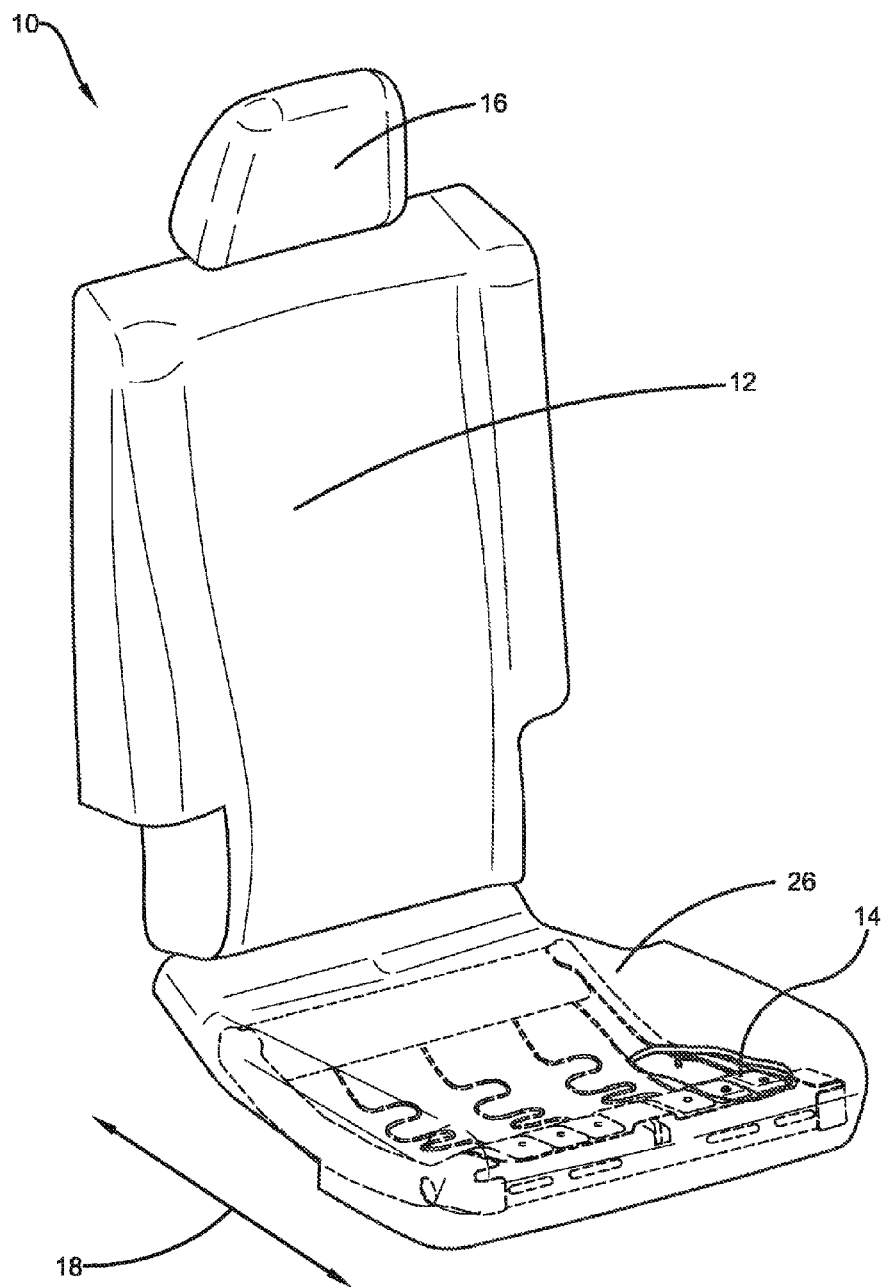
FIG. 1 is a perspective view of an exemplary seat for a vehicle according to the principles of the present disclosure.

With initial reference to FIG. 1, an exemplary seat 10 for a vehicle includes a seat back 12 and a seat bottom 26. The seat 10 extends between a front side and a rear side along a longitudinal axis of the vehicle, referenced at 18. The seat back 12 includes a head rest 16. The seat bottom 26 is engaged with or cooperates with the seat back 12. The seat bottom 26 cooperates with the seat back 12 to support an occupant of the vehicle. The seat bottom 26 includes an exemplary internal seat bottom assembly 14 providing structure to the seat bottom 26. The seat bottom 26 also includes padding and cloth covering the seat bottom assembly 14.

With initial reference to FIGS. 2-6, the exemplary seat bottom assembly 14 defines an anti-submarining device for minimizing or preventing potential submarining movement of an occupant during rapid deceleration of the vehicle. The exemplary seat bottom assembly 14 includes a seat bottom frame 20, at least one pivot shaft 22, and a panel 24. The pivot shaft 22 is mounted on the seat bottom frame 20 and supports the panel 24 for pivoting movement between a design position that is substantially flush with the seat bottom frame 20 and an open position that is angularly spaced from the design position and in which the panel's front edge is elevated. The panel 24 is shown in the design position in FIGS. 3 and 5 and is shown in the open position in FIGS. 4 and 6. The panel 24 minimizes submarining movement of a vehicle occupant sitting on the seat bottom assembly 14 during rapid deceleration of the vehicle. Any forward displacement of the occupant is stopped when the occupant's pelvic region confronts the panel 24 when the panel 24 is in the open position.

With continuing reference to FIGS. 2-6, the exemplary panel 24 defines a relatively small, forward portion of the seat to be pivoted. Thus, the panel 24 is not pivoted against the full weight of the seat occupant. Therefore, the arrangement applied to pivot the panel 24 need not be as robust or powerful as required in known anti-submarining devices.

Figure 2:
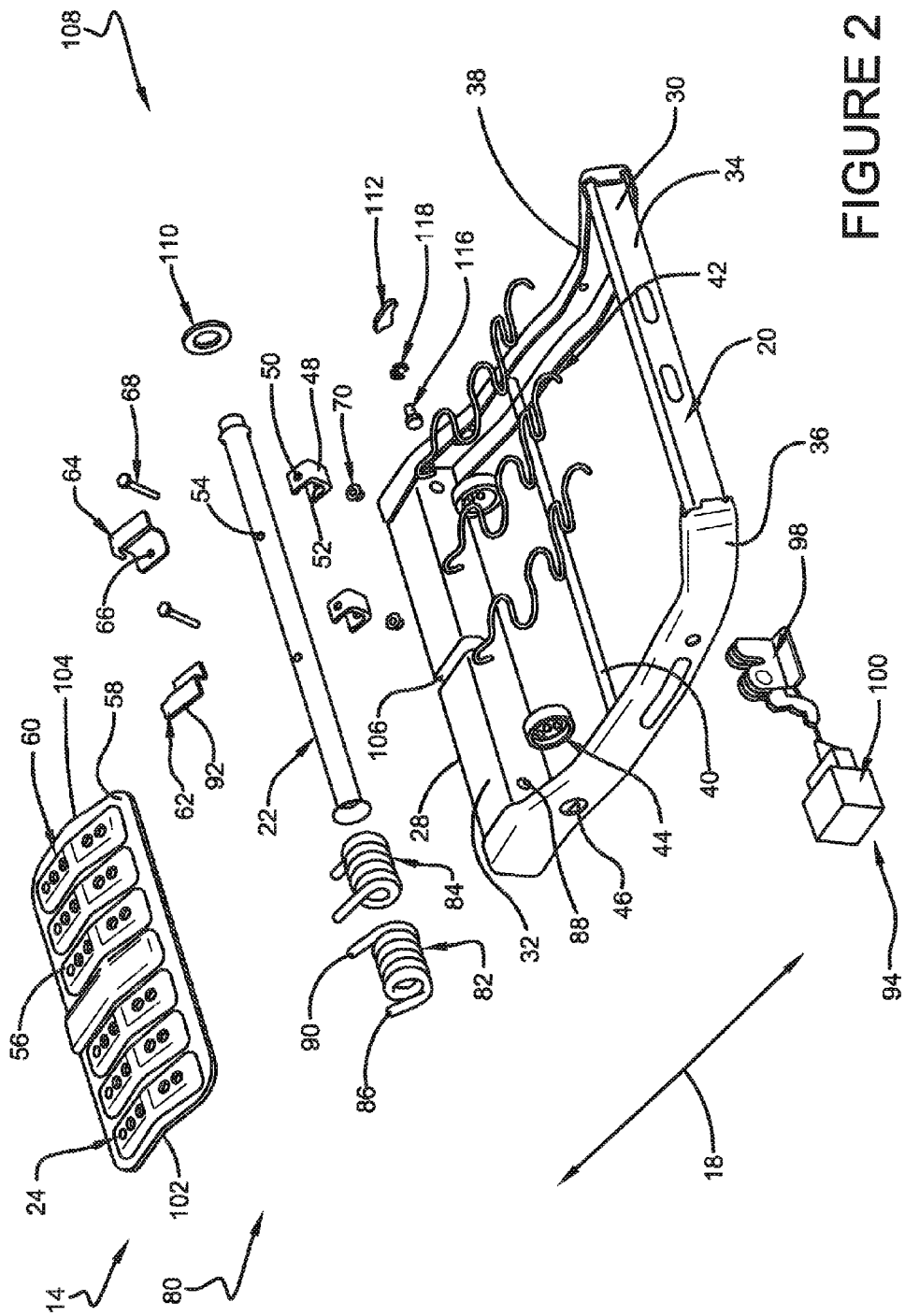
FIG. 2 is an exploded view of an exemplary seat bottom assembly according to the principles of the present disclosure.

With continuing reference to FIG. 2, the exemplary seat bottom frame 20 extends along the longitudinal axis 18 of the vehicle between a front edge 28 and a rear edge 30. The seat frame 20 includes front and rear crossbars 32, 34 as well as left and right side rails 36, 38. A cross tube 40 extends between the left and right side rails 36, 38. A plurality of suspension springs, such as suspension spring 42, extend between the cross tube 40 and the rear crossbar 34. Pivot bushings are respectively mounted in apertures formed in the left and right side rails 36, 38. For example, a pivot bushing 44 is mounted in an aperture 46 formed in the left side rail 36.

With continuing reference to FIG. 2, the pivot shaft 22 is mounted on the seat bottom frame 20. The pivot shaft 22 supports the panel 24 in pivoting movement. It is noted that, in alternative embodiments of the present disclosure, the panel 24 could be supported by multiple shafts. For example, a panel 24 could be supported by left and right shafts sharing a common pivot axis. Spacers are mounted on the pivot shaft 22. The spacers include apertures that align with apertures in the pivot shaft 22. For example, a spacer 48 is mounted on the pivot shaft 22 such that apertures 50, 52 in the spacer 48 are aligned with an aperture 54 in the pivot shaft 22.

With continuing reference to FIG. 2, the panel 24 extends along the longitudinal axis 18 of the vehicle between a front edge 56 and a rear edge 58. The front edge 56 of the panel 24 is substantially aligned with the front edge 28 of the seat bottom frame 20 along the longitudinal axis 18 when the panel 24 is in the design position. The rear edge 58 of the panel 24 is spaced from the rear edge 30 of the seat bottom frame 20 along the longitudinal axis 18 when the panel 24 is in both the design and open positions. The exemplary panel 24 includes a plurality of stiffening ribs, such as rib 60, to enhance strength.

With continuing reference to FIG. 2, support brackets 62, 64 are fixed to the panel 24. The support brackets 62, 64 each include an aperture for receiving a fastener to mount the panel 24 to the pivot shaft 22. For example, the support bracket 64 includes an aperture 66. The aperture 66 is aligned with the apertures 50, 52, and 54. A threaded bolt 68 is received in the apertures 50, 52, 54, 66, and a nut 70 engages the distal end of the threaded bolt 68 to mount the panel 24 to the pivot shaft 22.

With reference again to FIGS. 5 and 6, the front edge 56 of the panel 24 is substantially aligned with the front edge 28 of the seat bottom frame 20 along the longitudinal axis 18 when the panel is in the design position. In an exemplary embodiment of the present disclosure, the front edges 28, 56 are shown substantially aligned when the panel 24 is in the design position. In various embodiments, the front edge 28 can be slightly rearward of the front edge 56 as shown in FIG. 5, the front edge 28 can be slightly forward of the front edge 56, or the front edge 28 can be precisely aligned with the front edge 56.

Figure 5:
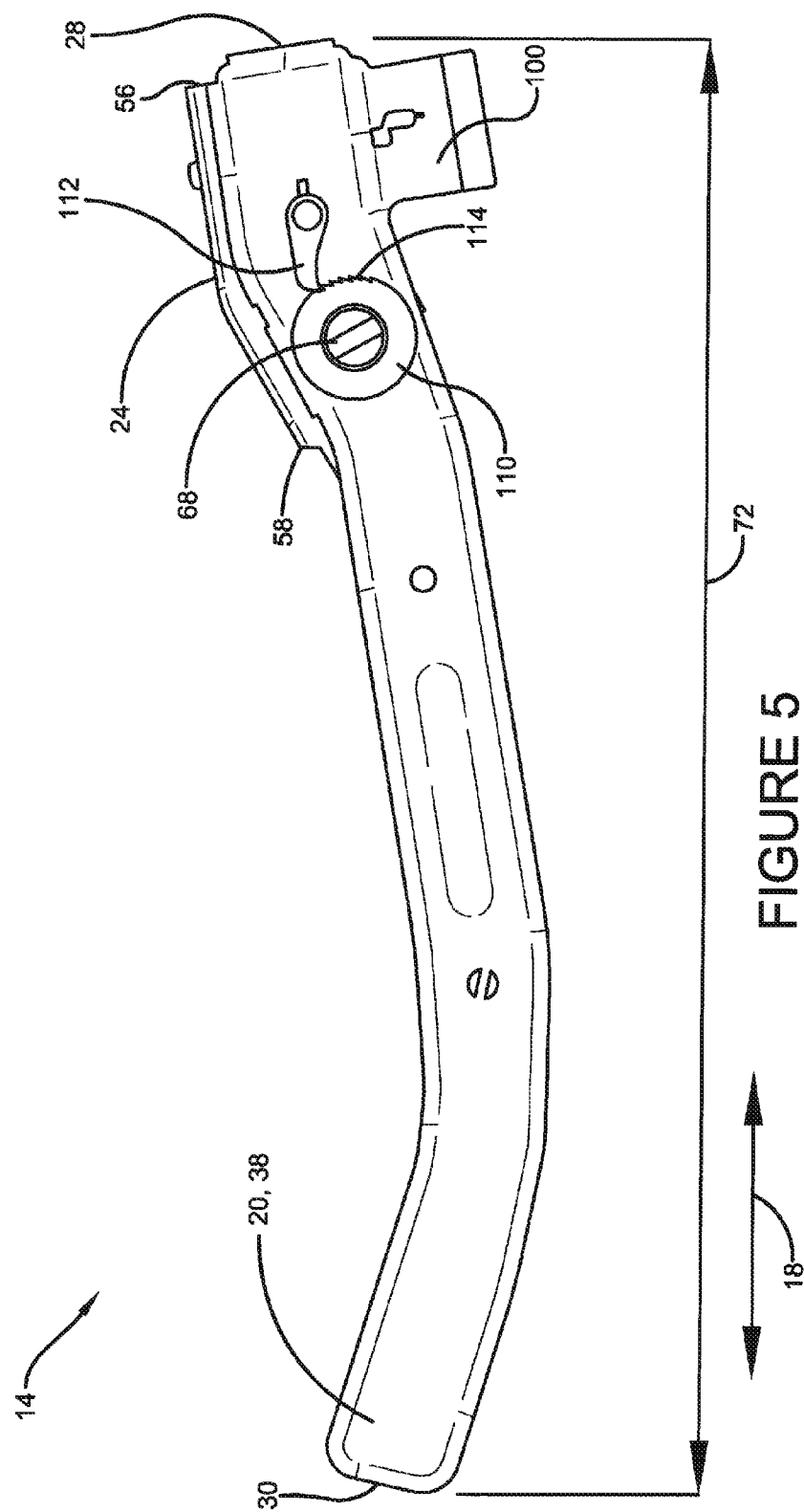
FIG. 5 is a side view of the exemplary seat bottom assembly shown in FIGS. 2-4 with the panel in the design position according to the principles of the present disclosure.
Figure 6:
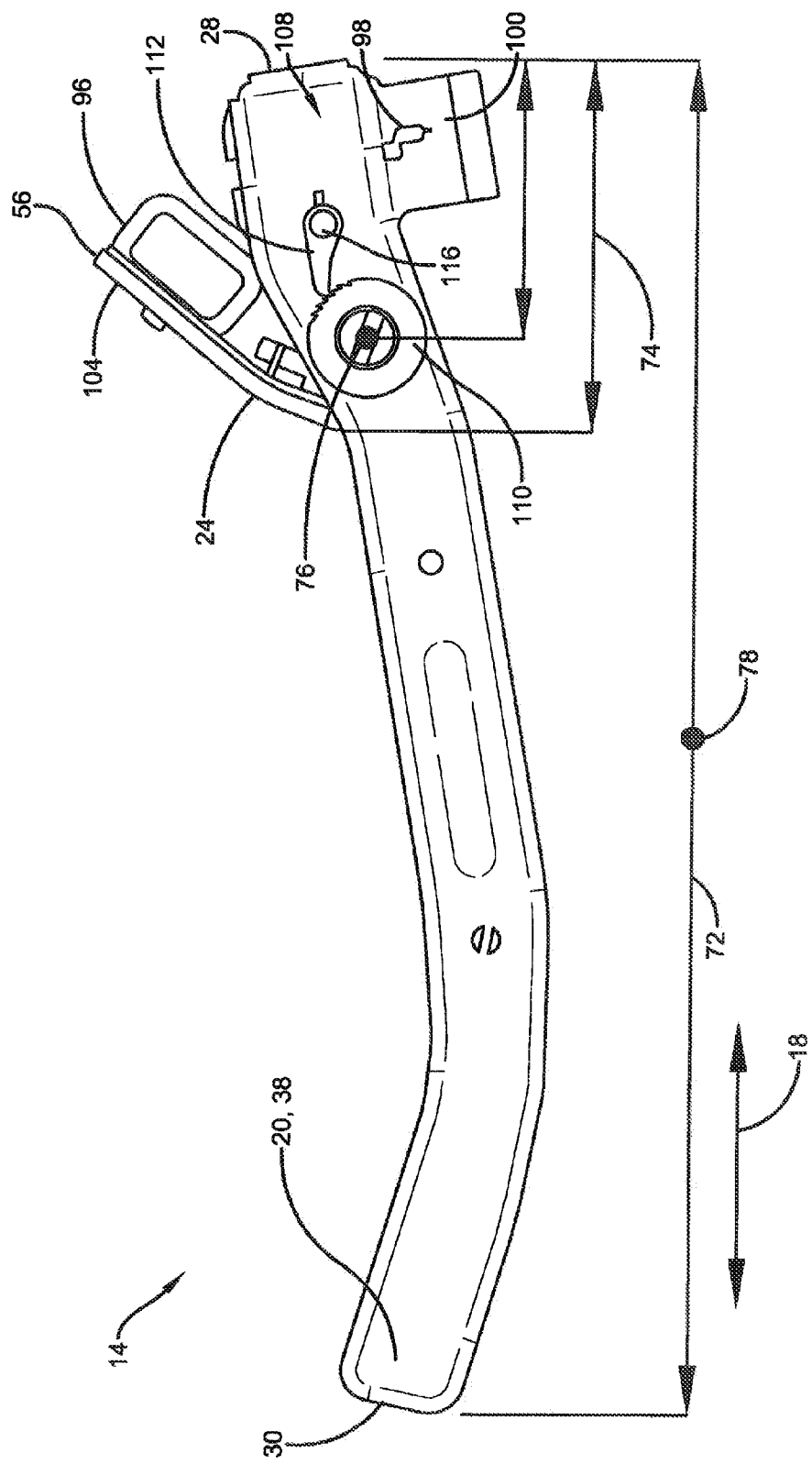
FIG. 6 is a side view of the exemplary seat bottom assembly shown in FIGS. 2-5 with the panel in the open position according to the principles of the present disclosure.

With continuing reference to FIGS. 5 and 6, the panel 24 and seat bottom frame 20 overlap one another along the longitudinal axis 18. A depth of the seat bottom frame 20 along the longitudinal axis 18 is referenced at 72. The depth 72 corresponds to the depth of the seat bottom 26 (shown in FIG. 1) and, further, to the space available to the occupant for sitting. In an exemplary embodiment of the present disclosure, the panel 24 extends less than half-way across the seat bottom frame 20 along the longitudinal axis 18. Also, as shown best in FIG. 6, the portion of the depth of the seat bottom frame 20 that is lost when the panel 24 pivots to the open position is approximately one-quarter the depth 72 of the seat bottom frame 20. This "lost" depth is referenced at 74. Thus, only a forward portion of the seat bottom assembly 14 opposes displacement during rapid deceleration of the vehicle. The rear edge 58 of the panel 24 is positioned substantially one quarter of the depth 72 from the front edge 28 of the seat bottom frame 20 when the panel 24 is in the open position.

With continuing reference to FIGS. 5 and 6, the compactness of the seat bottom assembly 14 is enhanced by positioning the pivot shaft 22 closer to the front edge 28 of the seat bottom frame 20 than the rear edge 30 of the seat bottom frame 20 along the longitudinal axis 18. As best shown in FIG. 6, a central axis 76 of the pivot shaft 22 is positioned closer to the front edge 28 of the seat bottom frame 20 than a midpoint 78 of the seat bottom frame 20 along the longitudinal axis 18.

Generally, the pelvic region of the occupant is positioned rearward of the depth 74. The pelvic region of the occupant extends along the longitudinal axis rearward of the midpoint 78. For example, the pelvic region of the occupant is positioned between the midpoint 78 and the rear edge 30 of the seat bottom frame 20 along the longitudinal axis 18.

With reference again to FIG. 2, the exemplary seat bottom assembly 14 includes at least one biasing device 80. In one exemplary implementation, the biasing device 80 includes left and right springs 82, 84 encircled by, or positioned within, the seat bottom frame 20. Each of the left and right springs 82, 84 encircles the pivot shaft 22. Each of the left and right springs 82, 84 is operably positioned between the seat bottom frame 20 and the panel 24 to urge the panel 24 to the open position. For example, a base end 86 of the spring 82 is received in an aperture 88 formed in the front crossbar 32. A biasing end 90 of the spring 82 acts against a shelf 92 of the support bracket 62. The biasing end 90 follows the shelf 92 as the panel 24 pivots. When the panel 24 is in the design position, the spring 82 is under a relatively higher level of torsion compression. When the panel 24 is in the open position, the torsion compression on the spring 82 is reduced.

With reference to FIGS. 2-4 and 6, the exemplary seat bottom assembly 14 includes a latching assembly 94 to selectively lock the panel 24 in the design position. In one exemplary implementation, the latching assembly 94 includes a striker 96, a latch 98, and an actuator 100. The striker 96 is fixed to the panel 24. The panel 24 extends along a lateral direction of the vehicle between an inner edge 102 and an outer edge 104, and the exemplary striker 96 is substantially centered between the inner and outer edges 102, 104. The front crossbar 32 of the seat bottom frame 20 includes a slot 106, and the striker 96 is received in the slot 106 when the panel 24 is in the design position. The latch 98 is mounted on the front crossbar 32 and is arranged for pivoting movement. In a latched position, the latch 98 engages the striker 96 and thereby holds the panel 24 in the design position. In a released position, the latch 98 is spaced from the striker 96, and the panel 24, under bias by the biasing device 80, pivots to the open position. The actuator 100 is operable to move the latch 98 from the latched position to the released position. In one exemplary implementation, the actuator 100 is a solenoid that, when energized, applies a pulling force on the latch 98, moving the latch from the latched position to the released position. The latch 98 and the actuator 100 are biased such that the latch 98 returns to the latched position when the actuator 100 is not energized.

With continuing reference to FIGS. 2-4 and 6, the actuator 100 is controlled by a vehicle controller or includes an onboard controller. The actuator 100 is energized in a dynamic vehicle event involving rapid deceleration of the vehicle. A dynamic vehicle event is detected by processing one or more signals emitted by one or more sensors positioned in the vehicle.

The arrangement of the exemplary biasing device 80, the exemplary latching assembly 94, and the exemplary actuator 100 allows the stroke length of the actuator 100 to be extremely small. The exemplary actuator 100 is a solenoid and the striker 96 and latch 98 are shaped such that the core of the solenoid need only be shifted centimeters or millimeters to release the panel 24. In one or more embodiments of the present disclosure, less than ten millimeters of stroke length may be sufficient.

With reference to FIGS. 2, 5, and 6, the exemplary seat bottom assembly 14 includes, in one exemplary implementation, a one-way locking device 108. The one-way locking device 108 is operable to permit pivoting movement of the panel 24 from the design position, but prevent pivoting movement of the panel 24 back to the design position. In a dynamic vehicle event, the one-way locking device 108 provides structural support to the panel 24 and reduces the likelihood that the force associated with the forward sliding of the occupant's mass causes the panel 24 to return to the design position.

With reference to FIGS. 2, 5, and 6, the one-way locking device 108, in one exemplary implementation, includes a ratchet 110 and a pawl 112. The ratchet 110 is fixed on the pivot shaft 22 and rotates with the pivot shaft 22. The ratchet 110 includes a plurality of teeth, such as tooth 114. Each tooth defines one of a plurality of different, possible angular positions of the panel 24.

With continuing reference to FIGS. 2, 5, and 6, the pawl 112 is mounted on the right or outer rail 38 of the seat bottom frame 20, on the outer side of the seat bottom frame 20. The pawl 112 is mounted on a pin 116 and biased against the ratchet 110 with a spring 118. The pawl 112 and ratchet 110 slide against one another when the panel 24 pivots toward the open position. The pawl 112 and ratchet 110 lock against one another when the panel 24 pivots toward the design position. Thus, the ratchet 110 and the pivot shaft 22 are freely rotatable together in an angular direction corresponding to pivoting movement of the panel 24 toward the open position. Further, the ratchet 110 and the pivot shaft 22 are locked against rotation in an angular direction corresponding to pivoting movement of the panel 24 toward the design position.

In accordance with various aspects of the present teachings, the exemplary vehicle seat bottom and anti-submarining system associated therewith enhances the ease of repair as well as the compactness relative to common anti-submarining devices. For example, after the seat bottom assembly 14 has been activated, the one-way locking device 108 must be released to return the panel 24 to the design position. In some embodiments, the covering and/or padding of the seat bottom 26 must be removed to access the one-way locking device 108. The pawl 112 defines a release of the exemplary one-way locking device 108. Thus, a relatively small portion of the covering and padding of the seat bottom 26 must be drawn back since the pawl 112 is positioned on an outwardly-facing edge of the seat bottom frame 20. Further, both structures of the exemplary one-way locking device 108, the ratchet 110 and the pawl 112, are positioned outside of the seat bottom frame 20. This allows relatively easy access to the one-way locking device 108. The exemplary anti-submarining system of the present disclosure also enhances compactness in that both the biasing device 80 and the one-way locking device 108 encircle the pivot shaft 22.

In an exemplary embodiment, the maximum angle of deployment of the panel 24 is independent of the stroke length of the actuator 100. Therefore, even an actuating device of relatively small size and/or one having a relatively short stroke length can operate with a panel having a relatively large angle of deployment. The exemplary panel 24 attains its position of maximum angular displacement when the forward-sliding occupant makes contact with the panel 24 and the force associated with the occupant urges the panel 24 back to the design position. In an exemplary embodiment, the one-way locking device 108 locks the panel 24 and prevents rotation back to the design position. The maximum angle of deployment of the panel 24 is reached when this occurs. Thus, the maximum angle of deployment of the panel 24 in operation corresponds to attributes of the occupant.

In conventional anti-submarining devices, the maximum angle of deployment is fixed and does not depend on the attributes of the occupant. The disadvantage is that if the occupant is large, overweight, or sitting towards the front portion of the seat, the occupant may confront the anti-submarining device before the device reaches the fixed, maximum angle of deployment. Thus, before the conventional anti-submarining device reaches its final position, at which it may be locked, the force associated with the occupant may urge the anti-submarining device back to its design position, thereby rendering the anti-submarining device ineffective. In an exemplary embodiment, the anti-submarine device of the present teachings provides at least some protection to the occupant in such circumstances, as the pawl 112 and ratchet 110 can lock together in a number of intermediate positions.

In an exemplary embodiment, the actuator 100 is packaged below the front crossbar 32. Thus, the actuator 100 does not fall directly in the path of the forward-sliding occupant. As a result, during rapid deceleration, the actuator 100 will not be damaged due to an impact with the forward sliding occupant.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A seat bottom assembly for a vehicle, the seat bottom assembly comprising:
   a seat bottom frame extending along a longitudinal axis of the vehicle between a front edge and a rear edge; and
   an anti-submarining device configured to minimize submarining movement of an occupant during rapid deceleration of the vehicle, the anti-submarining device including:
   a pivot shaft mounted on the seat bottom frame, and
   a panel extending along the longitudinal axis between a front edge and a rear edge, the panel mounted to the seat bottom frame through the pivot shaft for pivoting movement between a design position and an open position angularly spaced from the design position, the panel configured to oppose forward displacement of the occupant supported by the seat bottom frame while in the open position, wherein the rear edge of the panel is spaced forward of a midpoint of the seat bottom frame along the longitudinal axis;

a one-way locking device operable to permit pivoting movement of the panel from the design position and prevent pivoting movement of the panel to the design position; and a biasing device operably positioned between the seat bottom frame and the panel to urge the panel to the open position;

wherein the one-way locking device is positioned outside of the seat bottom frame and the biasing device is positioned inside the seat bottom frame.

2. The seat bottom assembly of claim 1, further comprising a biasing device operably positioned between the seat bottom frame and the panel to urge the panel to the open position.

3. The seat bottom assembly of claim 2, further comprising a latching assembly including:
   a striker fixed to the panel;
   a latch arranged for pivoting movement between a latched position engaging the striker and a released position spaced from the striker; and
   an actuator operable to move the latch from the latched position to the released position.

4. The seat bottom assembly of claim 3, wherein the panel extends along a lateral direction of the vehicle between an inner edge and an outer edge, and wherein the striker is substantially centered between the inner and outer edges.

5. The seat bottom assembly of claim 3, wherein the actuator exerts a pulling force on the latch.

6. The seat bottom assembly of claim 2, wherein the biasing device encircles the pivot shaft.

7. The seat bottom assembly of claim 1, wherein the one-way locking device includes a release positioned on an outwardly-facing edge of the seat bottom frame.

8. The seat bottom assembly of claim 1, wherein the one-way locking device includes a ratchet with a plurality of teeth, each tooth defining one of a plurality of different positions of the panel.

9. The seat bottom assembly of claim 8, wherein the ratchet is fixed on the pivot shaft, and wherein the one-way locking device further comprises a pawl mounted on the seat bottom frame, the ratchet and the pivot shaft freely rotatable in an angular direction corresponding to pivoting movement of the panel toward the open position, the ratchet and the pivot shaft locked against rotation in an angular direction corresponding to pivoting movement of the panel toward the design position.

10. The seat bottom assembly of claim 1, wherein the pivot shaft extends between opposite sides of the seat bottom frame and wherein the biasing device further comprises left and right springs encircled by the seat bottom frame.

11. The seat bottom assembly of claim 1, wherein the panel and the seat bottom frame overlap, and wherein the panel extends less than half-way across the seat bottom frame along the longitudinal axis.

12. The seat bottom assembly of claim 1, wherein the pivot shaft is positioned closer to the front edge of the seat bottom frame than the rear edge of the seat bottom frame along the longitudinal axis, and wherein a central axis of the pivot shaft is positioned closer to the front edge of the seat bottom frame than a midpoint of the seat bottom frame along the longitudinal axis.

13. The seat bottom assembly of claim 1, wherein the seat bottom frame defines a depth along the longitudinal axis and substantially one quarter of the depth is lost when the panel is in the open position.

14. A seat bottom assembly for a vehicle, the seat bottom assembly comprising:
   a seat bottom frame extending along a longitudinal axis of the vehicle between a front edge and a rear edge;
   an anti-submarining device configured to minimize submarining movement of an occupant during rapid deceleration of the vehicle, the anti-submarining device including:
      a pivot shaft mounted on the seat bottom frame, and
      a panel extending along the longitudinal axis between a front edge and a rear edge, the panel mounted to the seat bottom frame through the pivot shaft for pivoting movement between a design position and an open position angularly spaced from the design position, the panel configured to oppose forward displacement of the occupant supported by the seat bottom frame while in the open position;
      wherein the rear edge of the panel is spaced forward of a midpoint of the seat bottom frame along the longitudinal axis such that only a forward portion of the seat bottom assembly between the midpoint and the front edge of the seat bottom frame opposes forward displacement of the occupant when the panel is in the open position; and
   a latching assembly including:
      a striker fixed to the panel;
      a latch arranged for pivoting movement between a latched position engaging the striker and a released position spaced from the striker; and
      an actuator operable to move the latch from the latched position to the released position;
      Wherein the front edge of the seat bottom frame includes a slot, and wherein the striker is received in the slot when the panel is in the design position.

15. A seat bottom assembly for a vehicle, the seat bottom assembly comprising:
   a seat bottom frame extending along a longitudinal axis of the vehicle between a front edge and a rear edge;
   an anti-submarining device configured to minimize submarining movement of an occupant during rapid deceleration of the vehicle, the anti-submarining device including:
      a pivot shaft mounted on the seat bottom frame, and
      a panel extending along the longitudinal axis between a front edge and a rear edge, the panel mounted to the seat bottom frame through the pivot shaft for pivoting movement between a design position and an open position angularly spaced from the design position, the panel configured to oppose forward displacement of the occupant supported by the seat bottom frame while in the open position;
      wherein the rear edge of the panel is spaced forward of a midpoint of the seat bottom frame along the longitudinal axis such that only a forward portion of the seat bottom assembly between the midpoint and the front edge of the seat bottom frame opposes forward displacement of the occupant when the panel is in the open position;
   a one-way locking device operable to permit pivoting movement of the panel from the design position and prevent pivoting movement of the panel to the design position; and
   a biasing device operably positioned between the seat bottom frame and the panel to urge the panel to the open position, wherein the biasing device and at least a portion of the one-way locking device encircle the pivot shaft;
   wherein the one-way locking device is positioned outside of the seat bottom frame and the biasing device is positioned inside the seat bottom frame.

\* \* \* \* \*